United States Patent [19]

Clampitt

[11] 4,389,320

[45] Jun. 21, 1983

[54] FOAMABLE COMPOSITIONS AND FORMATIONS TREATMENT

[75] Inventor: Richard L. Clampitt, Bartlesville, Okla.

[73] Assignee: Phillips Petroleum Company, Bartlesville, Okla.

[21] Appl. No.: 260,471

[22] Filed: May 4, 1981

Related U.S. Application Data

[62] Division of Ser. No. 100,085, Dec. 4, 1979, Pat. No. 4,300,634.

[51] Int. Cl.$^3$ ..................... E21B 43/24; E21B 43/138
[52] U.S. Cl. ................................ 252/8.55 R; 166/272
[58] Field of Search .............. 166/272, 274, 288, 295; 252/8.55 R, 8.55 C, 8.55 D

[56] References Cited

U.S. PATENT DOCUMENTS

| | | | |
|---|---|---|---|
| 3,412,793 | 11/1968 | Needham | 166/288 X |
| 3,993,133 | 11/1976 | Clampitt | 166/272 |
| 4,085,800 | 4/1978 | Engle et al. | 166/288 |
| 4,244,826 | 1/1981 | Swanson | 166/307 X |
| 4,246,124 | 1/1981 | Swanson | 252/8.55 |

*Primary Examiner*—Herbert B. Guynn

[57] ABSTRACT

Thermally stable foamable gelled compositions suitable for post-primary oil recovery, e.g., steam- or gas-foamed systems comprising water, a surfactant, a polymeric viscosifier, an aldehyde component, and at least one phenolic component such as resorcinol, catechol, and the like, as well as selected oxidized phenolic materials such as 1,4-benzoquinone of natural or syntheic origin and natural and modified tannins. The gel compositions can additionally contain gel stabilizers such as sulfomethylated quebracho (SMQ) and chemical buffering agents such as sodium bicarbonate.

9 Claims, No Drawings

FOAMABLE COMPOSITIONS AND FORMATIONS TREATMENT

This is a divisional application of my copending application having Ser. No. 100,085, filed Dec. 4, 1979, now U.S. Pat. No. 4,300,634.

This invention relates to gelled compositions and to displacing oil in subterranean formations. In accordance with one aspect, this invention relates to thermally stable foamable gelled compositions comprising a surfactant, a polymeric viscosifier, an aldehyde, and at least one phenolic component such as resorcinol, catechol, and the like, as well as selected oxidized phenolic materials such as 1,4-benzoquinone of natural or synthetic origin and natural as well as modified tannins. In accordance with another aspect, this invention relates to foamable gelled compositions containing as surfactant, a polymeric viscosifier, and a gel stabilizer. In accordance with a further aspect, this invention relates to foamable gelled compositions containing a surfactant, a polymeric viscosifier, and a chemical buffering agent. In a further aspect, this invention relates to foamed gelled compositions containing a surfactant and as polymeric viscosifiers a polyacrylamide or a cellulose polymer, an aldehyde, and a phenolic component with or without a gel stabilizer and a chemical buffering agent. In accordance with a still further aspect, this invention relates to fluid displacement of oil within subterranean formations using the above-described foamable gelled compositions in a steam- or gas-foamed system.

In oil well production, it is quite common to inject various gases, including steam, into oil wells to increase the production of oil from those wells. One common method of increasing production is the cyclic steam stimulation method wherein production of oil from the well is periodically interrupted and steam is injected in the well. Steam serves to melt some of the waxes in the strata and reduce the viscosity of the oil surrounding the wellbore so that it will flow more readily into the wellbore and be produced therefrom. A second method is the direct drive injection of steam or other gases continuously into one well whereby oils in the various earth strata are pushed ahead of the steam or gas being injected and are produced from another nearly well.

One of the problems faced in either type of injection of gases or steam into the well arises from the varying permeability of the different earth strata. Where there is a considerable difference in the permeability of different strata, the injected gas will flow into the more permeable strata preferentially or, on occasion, almost exclusively. Since the oil to be produced may be very largely in the less permeable strata, a considerable quantity of gas or steam will be injected into the well with little success.

Various methods of plugging or sealing off the highly permeable strata so that the steam may be directed into the less permeable strata have been proposed. One method which has been proposed is the introduction of foam into the more permeable strata by pumping into the well a water solution of a surface-active agent. Another method involves introducing steam and a foaming agent into the formation whereby a foam having steam as its gaseous phase is formed, and, upon condensation of the steam due to loss of heat, the foam collapses. The present invention is directed to an improved process for increasing the resistance to fluid flow over a longer period of time when using steam and a foaming agent which foams having steam as its gaseous phase.

The present invention provides a solution for, or at least mitigates, the above-discussed problems. The present invention provides improved methods for steam diversion in subterranean formations as well as new foamable gel compositions for use in said method.

Accordingly, an object of this invention is to provide for the production of oil from an oil-bearing formation or stratum.

It is another object of this invention to increase the efficiency of oil recovery from such a formation.

Another object of this invention is to provide a method for sealing portions of a formation which have a relatively high permeability which interferes with the use of a driving force to force oil from less permeable portions of the formation.

A further object of this invention is to provide a higher pressure, e.g., steam direct drive system, for producing oil from an oil-bearing formation.

Another object of this invention is to provide a method for temporarily plugging permeable strata.

It is a further object of this invention to provide a process for producing a well by plugging more permeable strata with a self-destructive foam.

Other objects, aspects, and the several advantages of the invention will become apparent to those skilled in the art upon reading the specification and the appended claims.

In accordance with the invention, gelled compositions are provided comprising water; a surfactant; a water-dispersible polymer selected from cellulose ethers, polyacrylamides, biopolysaccharides, and polyalkylene oxides; one or more water-dispersible aldehydes; and one or more phenolic components such as resorcinol, catechol, and the like, as well as selected oxidized phenolic components such as 1,4-benzoquinone of natural or synthetic origin and natural and modified tannins, optionally containing a gel stabilizer such as sulfomethylated quebracho (SMQ) and a chemical buffering agent such as sodium bicarbonate.

Further, in accordance with the invention, the above and other objects of the invention are accomplished by injecting steam into subterranean oil-bearing formations together with an aqueous surfactant solution containing a chemically crosslinkable, water-dispersible polymer which prevents the surfactant from foaming until after it is in the formation and after the polymer breaks down due to heat in the formation. After the polymer breaks down, the surfactant forms a self-collapsing foam having a condensable gas as its gaseous phase.

More specifically, according to the invention, an aqueous surfactant solution containing at least one chemically crosslinkable, at least water-dispersible polymer selected from polyacrylamides and related polymers, cellulose ethers, polyalkylene oxides and polysaccharides which can be crosslinked or gelled in an aqueous medium with aldehyde/phenolic gelling agents are injected with steam into subterranean oil-bearing formations under conditions which produce a selective blocking due to the formation of foam in the more permeable sections of the formation which forces injection steam to produce oil from less depleted portions of the formation.

In accordance with one specific embodiment, gelled cellulose ether polymers and surfactants are injected with steam into a subterranean oil-bearing formation through a well to divert the steam to the zones containing oil. The polymers prevent the surfactants from foaming until these materials are in the formation while serving to plug the more porous zones until the polymers are broken down by heat.

In accordance with one presently preferred embodiment of the invention, an aqueous surfactant solution containing a gelled cellulose ether polymer is injected with steam into a formation either through an injection well or a production well to selectively plug or block the more depleted portions of the formation and thereby force the remaining steam to produce oil from the less depleted portions of the formation.

As indicated hereinbefore, it is presently preferred to use gelled cellulose ether polymers in combination with foamable surfactants to reduce channeling in steam drive systems in subterranean oil-bearing formations. Other polymers and polysaccharides which can be crosslinked or gelled in an aqueous medium can be used with and/or instead of cellulose ether polymers to make the gels.

Further, in accordance with one specific embodiment of the invention, the foamable gelled polymer compositions defined above can additionally contain a gel stabilizer and/or a chemical buffering agent.

In accordance with another specific embodiment of the invention, the combination of formaldehyde and resorcinol added to a thickened aqueous solution containing a water-dispersible polymer as defined results in stable gels with temperature-dependent gelation rates.

Still further, in accordance with other broad aspects of the invention, there are provided methods for preparing the gelled compositions of the invention.

In some embodiments of the invention, only one aldehyde can be used; if desired, however, a mixture of aldehydes can be used.

In some embodiments of the invention, only one phenolic compound can be used; if desired, however, a mixture of phenolic compounds can be used.

The invention compositions are suitable as gas or steam diversion agents in oil well treatments. The gel foam of the invention can be used in direct steam drive applications, particularly where channeling problems are observed between injection and production wells. The inventive compositions can also be used in other thermal operations, particularly gas injection operations, i.e., flue gas, nitrogen, $CO_2$, where air channeling problems through fractures or high permeability non-fractured zones is a problem.

The polymeric materials which are suitable for use in the practice of the invention include at least one chemically crosslinkable, at least water-dispersible polymer selected from the group consisting of polyacrylamides and related polymers, cellulose ethers, polyalkylene oxides, and polysaccharides which can be gelled in an aqueous medium with aldehyde and phenolic gelling agents. Where used, in the specification and in the claims, unless otherwise specified, the term "polymer" is emloyed generically to include both homopolymers and copolymers, and the term "water-dispersible polymers" is employed to include those polymers which are truly water-soluble and those which are dispersible in water or other aqueous medium to form stable colloidal suspensions which can be crosslinked as described in U.S. Pat. No. 3,785,437 and U.S. Pat. No. 3,373,810, which are incorporated herein by reference. Representative examples of suitable polymers, the preparation of these polymers, and specific polymeric materials that can be employed in the present invention are set forth in said patents.

As set forth in U.S. Pat. No. 3,785,437, representative cellulose ethers which can be used in the practice of the present invention include, inter alia, the various carboxyalkyl cellulose ethers, e.g., carboxyethyl cellulose and carboxymethyl cellulose (CMC); mixed ethers such as carboxyalkyl hydroxyalkyl ethers, e.g., carboxymethyl hydroxyethyl cellulose (CMHEC); hydroxyalkyl celluloses such as hydroxyethyl cellulose and hydroxypropyl cellulose; alkylhydroxyalkyl celluloses such as methylhydroxypropyl cellulose; alkyl celluloses such as methyl cellulose, ethyl cellulose, and propyl cellulose; alkylcarboxyalkyl celluloses such as ethylcarboxymethyl cellulose, alkylalkyl celluloses such as methylethyl cellulose; and hydroxyalkylalkyl celluloses such as hydroxypropylmethyl cellulose; and the like. Many of said cellulose ethers are available commercially in various grades. Cellulose ethers are commonly designated in practice as CMC-7, CMC-9, CMC-12, etc., wherein the 7, 9, and 12 refer to a degree of substitution of 0.7, 0.9, and 1.2, respectively.

Any suitable polymer of acrylamide meeting the above-stated compatibility requirements can be used in the practice of the invention. Thus, under proper conditions of use, such polymers can include various polyacrylamides and related polymers which are water-dispersible and which can be used in an aqueous medium, with the gelling agents described herein, to give an aqueous gel as set forth in U.S. Pat. No. 3,785,437. These can include the various substantially linear homopolymers and copolymers of acrylamide and methacrylamide. By substantially linear is meant that the polymers are substantially free of crosslinking between the polymer chains. Said polymers can have up to about 45, preferably up to about 40, percent of the carboxamide groups hydrolyzed to carboxyl groups. Generally speaking, as the degree of hydrolysis increases, the polymers tend to become more difficult to disperse in brines, especially hard brines. Thus, one presently more preferred group of polymers includes those wherein not more than about 20 percent of the carboxamide groups are hydrolyzed. As used herein and in the claims, unless otherwise specified, the term "hydrolyzed" includes modified polymers wherein the carboxyl groups are in the acid form and also such polymers wherein the carboxyl groups are in the salt form, provided said salts are water-dispersible. Such salts include the ammonium salts, the alkali metal salts, and others which are water-dispersible. Hydrolysis can be carried out in any suitable fashion, for example, by heating an aqueous solution of the polymer with a suitable amount of sodium hydroxide.

All the polymers useful in the practice of the invention are characterized by high molecular weight. The molecular weight is not critical so long as the polymer has the above-described water-dispersible properties and meets the above-stated compatability requirements. It is preferred that the acrylamide-derived polymers have a molecular weight of at least 500,000, more preferably at least about 2,000,000, whereas the suitable cellulose ether polymers should have a molecular weight of at least 200,000. The upper limit of molecular weight is unimportant so long as the polymer is water-dispersible and the gelled composition therefrom can be pumped. Thus, it is within the scope of the invention to use polymers having molecular weights as high as 20,000,000 or higher and meeting said conditions.

The amount of the above-described polymers used in preparing the gelled compositions of the invention can vary widely depending upon the particular polymer used, the purity of said polymer, and properties desired in said compositions. In general, the amount of polymer used will be a water-thickening amount, i.e., at least an amount which will significantly thicken the water to which it is added. For example, amounts in the order of 25 to 100 parts per million by weight (0.0025 to 0.01 weight percent) have been found to significantly thicken water. Generally speaking, amounts of the above-described polymers in the range of from 0.1 to 5, preferably from 0.3 to about 2, weight percent, based on the total weight of the composition, can be used in preparing gelled compositions for use in the practice of the invention.

As a further guide, when the polymer used is one of the AMPS or AMPS salt copolymers containing 50 mol percent or more AMPS or AMPS salt units, the polymer concentration will preferably be in the range of from 0.6 to 3, more preferably 0.75 to about 2, weight percent, based on the total weight of the composition. Similarly, when the polymer used is a partially hydrolyzed polyacrylamide or polymethacrylamide, or one of the MTMMS or DEMMS copolymers (see U.S. Pat. No. 4,103,742), the polymer concentration will preferably be in the range of from 0.75 to about 2 weight percent, based on the total weight of the composition. In general, with the proper amounts of phenolic compound and aldehyde, the amount of polymer used will determine the consistency of the gel obtained. Small amounts of polymer will usually produce liquid mobile gels which can be readily pumped. Large amounts of polymer will usually produce thicker, more viscous, somewhat elastic gels. Gels having a viscosity "too thick to measure" by conventional methods can still be used in the practice of the invention. Thus, there is really no fixed upper limit on the amount of polymer which can be used as long as the gelled composition can be pumped in accordance with the methods of the invention.

Other polymers that can be used in the gels of the invention include polyalkylene oxides and biopolysaccharides, which are biochemically synthesized polysaccharides. These polymers are well known and can be produced in accordance with known procedures. Suitable polyalkylene oxides that can be used include polyethylene oxide, polypropylene oxide, polybutylene oxide and the like as well as derivatives thereof as set forth in U.S. Pat. No. 4,124,073, issued to Donald R. Wier on Nov. 7, 1978, which is incorporated herein by reference. Preparation details of the biopolysaccharides can be found in U.S. Pat. No. 3,373,810, which is incorporated herein by reference, and references cited therein. The amounts of these polymers used in the instant gel compositions can be the same as for the acrylamide polymers and cellulose ethers.

Any suitable water-dispersible aldehyde meeting the above-stated compatibility requirements can be used in the practice of the invention. Thus, under proper conditions of use, both aliphatic and aromatic monoaldehydes, and also dialdehydes, can be used. The aliphatic monoaldehydes containing from one to about 10 carbon atoms per molecule are presently preferred. Representative examples of such aldehydes include formaldehyde, paraformaldehyde, acetaldehyde, propionaldehyde, butyraldehyde, isobutyraldehyde, valeraldehyde, heptaldehyde, decanal, and the like. Representative examples of dialdehydes include glyoxal, glutaraldehyde, terephthalate, and the like. Various mixtures of said aldehydes can also be used in the practice of the invention. The term "water-dispersible" is employed generically herein to include both those aldehydes which are truly water-soluble and those aldehydes of limited water solubility but which are dispersible in water or other aqueous media to be effective gelling agents. Formaldehyde is the preferred aldehyde compound for use in the present invention.

Any suitable water-dispersible phenol or naphthol meeting the compatibility requirements set forth above can be used in the practice of the invention. Suitable phenols include monohydroxy and polyhydroxy naphthols. Phenolic compounds suitable for use in the present invention include phenol, catechol, resorcinol, phloroglucinol, pyrogallol, 4,4'-diphenol, 1,3-dihydroxynaphthalene, and the like. Other phenolic components that can be used include at least one member of selected oxidized phenolic materials of natural or synthetic origin such as 1,4-benzoquinone; hydroquinone or quinhydrone; as well as a natural or modified tannin such as quebracho or sulfomethylated quebracho possessing a degree of sulfomethylation (DSM) up to about 50. (See U.S. Pat. No. 3,344,063, col. 3, lines 15–32, which is incorporated herein by reference.) The DMS of sulfomethylated quebracho (SMQ) is sometimes indicated by writing, for example, SMQ 50 for SMQ having a DSM of 50. Resorcinol and catechol are the preferred phenolic compounds for use in the present invention for most water diversion applications. Phloroglucinol gives a very fast gelation rate and is preferred for some applications.

Any suitable amount of aldehydes and phenolic compounds can be used in the practice of the invention. In all instances the amounts of aldehyde and phenolic compound used will be a small, but effective amount which is sufficient to cause gelation of an aqueous dispersion of the polymer, the aldehyde, and the phenolic compound. As a general guide, the amount of aldehyde used in preparing the gelled compositions of the invention will be in the range of from about 0.02 to 2, preferably 0.1 to about 0.8, weight percent, based on the total weight of the composition. The weight ratio of sulfomethylated quebracho to polymer is in the range of 0.1:1 to 5:1, preferably 0.5:1 to 2:1. The polymer concentration is in the broad range of 1,000 to 50,000 ppm, preferably 3,000 to 20,000 ppm. The concentration of phenolic material (other than SMQ) will be in the range of 0.005 to 2, preferably 0.04 to 1, weight percent.

As indicated previously, it is also within the scope of the invention to use gel stabilizers such as sulfomethylated quebracho. Quebracho is a flavotannin which is water-extracted from the bark and wood of the quebracho tree. The conventional method of preparing quebracho is to disintegrate the wood and bark followed by extraction with water. The aqueous extract is concentrated to remove about 85 percent of the water, and the residual quebracho is spray-dried. Quebracho is the commercial catechol tannin, or flavotannin product. The quebracho can be sulfomethylated as is known in the art, as is disclosed in U.S. Pat. No. 3,344,063. The amount of gel stabilizer used will vary from about 20 to about 200 weight percent, based on the weight of polymer. When used as a gel stabilizer, the sulfomethylated quebracho will have a DSM in the broad range of about 85 to 250, preferably about 100 to about 200.

It is also within the scope of the invention to use a chemical buffering agent during the gelation process. Most preferred buffering agents include water-soluble bicarbonate salts such as $NaHCO_3$, $KHCO_3$, and $LiHCO_3$. The corresponding carbonate salts are also suitable. The amount of chemical buffering agent used will vary broadly from about 0.05 to about 1, preferably about 0.1 to about 0.5, weight percent, based on the weight of the total composition.

As indicated hereinbefore, the objects of the invention are achieved in selectively blocking and plugging permeable sections of subterranean oil-bearing formations by injecting with steam an aqueous surfactant solution containing a water-dispersible polymer which prevents the surfactant from foaming until it has been in the formation for some time. The amount of surfactant present in the aqueous solution should be sufficient to form a stable, self-collapsing foam when said solution is contacted with steam after the polymer has broken down due to heat. Generally, the aqueous solution will contain about 0.1 to about 3 weight percent polymer. The amount of surfactant present in the solution will ordinarily be in the range of about 0.1 to about 10 weight percent, preferably 1 percent to 6 percent, based on the weight of the total composition.

Various types of surface-active agents can be used in the process of my invention, either nonionic, anionic, or cationic and mixtures thereof. Commercial surface-active agents of the alkylphenoxy polyethoxy ethanol class and commonly available household cleansers have been tested and found satisfactory in the practice of my invention. The surfactants must be stable at the operating conditions of this invention. For example, Trend detergent, manufactured by Purex Corporation, Ltd., has proved satisfactory, as well as other household cleaning compounds, hand and laundry soaps, and rug shampoos.

Other water-soluble surfactants which have been found stable at temperatures used to carry out this invention are alkylphenoxypoly(ethyleneoxy) ethanol surfactants sold by GAF corporation, Chemical Division, 140 West 51st, New York, N.Y. 10020, as Igepal surfactants. The particular Igepal surfactants are sold under the trade names as DM970, DM730, DM710, and CA720. The aliphatic polyether surfactants sold by the GAF corporation under the trade names Antarax BL330 and BL344 have also been found to be effective water-soluble surfactants usable in carrying out this invention.

Surfactants have been used to produce foams in formations. *Society of Petroleum Engineers Journal*, December 1970: S. H. Raza, "Foam in Porous Media: Characteristics and Potential Applications." Note FIG. 2 and pages 330 and 335. A surfactant solution useful in the present invention is OK liquid (ammonium lauryl sulfate plus amide builder manufactured by Proctor and Gamble) in a water solution at a concentration as low as approximately 0.3 weight percent. Such solutions are referred to in the *Society of Petroleum Engineers Journal* as useful to produce foam in porous media. After the injection of the surfactant solution into the producing well, steam channeling through the introduced solution to reach the producing well will generate a foam consisting of water as the external phase and steam as the gaseous phase. This foam is generated in precisely the porosities through which the undesirable channeling has occurred and therefore a selective blocking is produced forcing the remaining steam to produce oil from less depleted portions of the formation.

The aqueous surfactant solution containing the gelled polymer can be introduced into the formation along with steam either through an injection well penetrating the formation and/or a production well penetrating the formation.

The invention is applicable to formations produced by direct steam drive as where there is a steam injection well and a producing well. It is also applicable to the production of a formation using a cyclic or "huff-puff" operation. In any event, when there is being produced from the producing well or during a producing cycle excessive steam and/or hot water, the invention can be applied to substantially plug or seal channelings through which the steam preferentially finds its way, resulting in a production of insufficient oil.

Any suitable method can be employed for preparing the gelled compositions of the invention. Thus, any suitable mixing technique or order of addition of the components of said composition to each other can be employed which will provide a composition having sufficient stability to degeneration by the heat of the formation (in which the composition is to be used) to permit good penetration of the composition into said formation. However, it is ordinarily preferred to first dissolve or disperse the polymer in water before contacting the polymer with the other components. The mixing order can vary with the type of polymer used. Some suitable mixing orders, with the components named in order of mixing, include: water—surfactant—polymer—phenolic compound—aldehyde; water—phenolic compound—surfactant—polymer—aldehyde; phenolic compound—polymer—water—surfactant—aldehyde; and water—surfactant—polymer—aldehyde—phenolic compound; and the like. It is within the scope of the invention to moisten or slurry the polymer with a small amount, e.g., about 1 to about 6 weight percent, based on the weight of the polymer, of a small amount of a low molecular weight alcohol, e.g., $C_1$ to $C_3$ alcohols, as a dispersion aid prior to dispersing the polymer in water.

The gelled or ungelled compositions of the invention can be prepared on the surface in a suitable tank equipped with suitable mixing means, and then pumped down the well and into the formation employing conventional equipment for pumping gelled compositions. However, it is within the scope of the invention to prepare said compositions while they are being pumped down the well. This technique is sometimes referred to as "on the fly." For example, a solution of the polymer in water can be prepared in a tank adjacent the wellhead. Pumping of this solution through a conduit to the wellhead can then be started. Then, a few feet downstream from the tank a suitable connection can be provided for introducing either the phenolic compound or the aldehyde and surfactant into said conduit, preferably as an aqueous solution. Then, a few feet farther downstream the other of said phenolic or aldehyde and surfactant components can be similarly introduced. As will be understood by those skilled in the art, the rate of introduction of said components into said conduit will depend upon the pumping rate of the polymer solution through said conduit. Any of the above-mentioned orders of addition can be employed in said "on the fly" technique. Mixing orifices can be provided in said conduit, if desired.

It is within the scope of the invention to precede the injection of the gelled composition into the well and out into the formation with a preflush of a suitable cooling fluid, e.g., water. Such fluids serve to cool the well tubing and formation and extend the useful operating temperature range of said compositions. The volume of said cooling fluid so injected can be any suitable volume sufficient to significantly decrease the temperature of the formation being treated, and can vary depending upon the characteristics of the formation. For example, amounts up to 20,000 gallons or more can be used to obtain a temperature decrease in the order of 100° to 250° F.

The following example will serve to further illustrate the invention, but should not be considered as unduly limiting on the invention.

SPECIFIC EXAMPLE

Two solutions of aqueous polyacrylamide (10,000 ppm Reten 420, a commercially available acrylamide homopolymer with a 6.3 percent degree of hydrolysis) were prepared by stirring the appropriate weight of polymer in 200 ml aliquots of tap water for a few minutes and then rolling the individual mixtures in sealed containers for several hours to complete solution. To these respective polymer solutions were added the listed components in the order given:

| Formulation A (Control) | Formulation B (Invention) |
|---|---|
| (i) Resorcinol (2000 ppm) | (i) Resorcinol (2000 ppm) |
| (ii) NaHCO$_3$ (2000 ppm) | (ii) NaHCO$_3$ (2000 ppm) |
| (iii) Formaldehyde (2000 ppm) | (iii) Formaldehyde (2000 ppm) |
| | (iv) Cor 180[a] Surfactant (3% by volume) |

[a] A description of Cor 180 is given in U.S. Pat. No. 3,993,133 at Col. 8.

During the addition of the various components, the polymer solutions were stirred with a Hamilton Beach Maltmixer. Formulations A and B were transferred to individual glass pressure bottles and the sealed vessels were aged in an oil bath at 325° F. After 12 days at 325° F., both gels from formulations A and B were stable, however, it was noticed that the inventive formulation exhibited a slower gelation rate. This observed thermal stability of the gel resulting from the inventive formulation B substantiates the feasibility of using the instant composition to stabilize foams used at high temperatures for selectively plugging oil-bearing subterranean formations.

Although the invention has been expressed in terms of use in steam drive treatment of subterranean formations, it is also within the scope of the invention to use other gases such as flue gas, nitrogen, CO$_2$ and the like. These can be used under high temperature as well as low temperature treatment processes.

I claim:

1. A foamable gelled composition consisting essentially of
   (a) water,
   (b) a water-soluble surfactant in an amount which is sufficient to form a stable, self-collapsing foam when the composition is contacted with steam after polymer component (c) breaks down due to heat,
   (c) a water-thickening amount of a water-dispersible polymer selected from the group consisting of cellulose ethers, polyacrylamides, polyalkylene oxides, and biopolysaccharides produced by the action of bacteria of the genus Xanthomonas upon carbohydrates,
   (d) a small, but effective amount in the range of 0.02 to 2 weight percent, of at least one aldehyde component selected from the group consisting of glyoxal, glutaraldehyde, and terephthaldehyde, and aliphatic monoaldehydes having from one to about 10 carbon atoms per molecule, and
   (e) a small, but effective amount in the range of 0.005 to 2 weight percent of at least one phenolic compound selected from the group consisting of phenol, catechol, resorcinol, phloroglucinol, pyrogallol, 4,4'-diphenol, 2,3-dihydroxynaphthalene, 1,4-benzoquinone, hydroquinone, quinhydrone, and quebracho which amounts of aldehyde (d) and phenolic compound (e) are sufficient to cause gelation of an aqueous dispersion of polymer (c) and form said gelled composition.

2. A composition according to claim 1 wherein aldehyde (d) is formaldehyde.

3. A composition according to claim 1 wherein the amount of (b) present ranges from about 0.1 to about 10 weight percent based on the weight of the total composition.

4. A composition according to claim 1 wherein there is additionally present
   (f) a gel stabilizer comprising sulfomethylated quebracho having a DSM ranging from about 85 to 250 in an amount ranging from about 20 to about 200 weight percent based upon the weight of polymer (c) and
   (g) a chemical buffering agent comprising water-soluble carbonate and bicarbonate salts in an amount ranging from 0.05 to 1 weight percent based on the weight of total composition.

5. A composition according to claim 4 where (g) is sodium bicarbonate.

6. A composition according to claim 1 wherein the amount of (b) is in the range of 1 to 6 weight percent, the amount of (c) is in the range of 0.1 to 5 weight percent, the amount of (d) is in the range of 0.1 to 0.8 weight percent, and the amount of (e) is in the range of 0.04 to 1 weight percent.

7. A composition according to claim 6 wherein (c) is a partially hydrolyzed polyacrylamide or a cellulose ether, (d) is formaldehyde, and (e) is phenol, catechol, hydroquinone, 1,4-benzoquinone, quebracho, sulfomethylated quebracho having a DSM of 10-50, resorcinol, or phloroglucinol.

8. A composition according to claim 1 wherein (c) is a partially hydrolyzed polyacrylamide wherein not more than about 45 percent of the carboxamide groups are initially hydrolyzed to carboxyl groups; (d) is formaldehyde, and (e) is resorcinol.

9. A composition according to claim 8 which additionally contains
   (f) sulfomethylated quebracho (SMQ) having a DSM ranging from about 85 to 250 as a gel stabilizer and/or
   (g) sodium bicarbonate as a chemical buffering agent.

* * * * *